(12) United States Patent
Jöngren et al.

(10) Patent No.: US 8,064,394 B2
(45) Date of Patent: Nov. 22, 2011

(54) METHODS AND SYSTEMS FOR CODEWORD TO LAYER MAPPING

(75) Inventors: George Jöngren, Stockholm (SE); Ari Kangas, Lidingö (SE)

(73) Assignee: Telefonaktiebolaget L M Ericsson (SE)

( * ) Notice: Subject to any disclaimer, the term of this patent is extended or adjusted under 35 U.S.C. 154(b) by 868 days.

(21) Appl. No.: 12/029,103

(22) Filed: Feb. 11, 2008

(65) Prior Publication Data

US 2008/0192718 A1 Aug. 14, 2008

(30) Foreign Application Priority Data

Feb. 14, 2007 (SE) ...................................... 0700368

(51) Int. Cl.
*H04J 1/00* (2006.01)
*H04W 76/00* (2009.01)
(52) U.S. Cl. .......................... 370/329; 370/343; 714/748
(58) Field of Classification Search .................. None
See application file for complete search history.

(56) References Cited

U.S. PATENT DOCUMENTS 7,391,755 B2* 6/2008 Gopalakrishnan et al. ... 370/334
7,835,337 B2* 11/2010 Kim et al. ..................... 370/342
2007/0011550 A1* 1/2007 Agrawal et al. ............... 714/746
2007/0260956 A1* 11/2007 Terry et al. .................... 714/748
2010/0027697 A1* 2/2010 Malladi et al. ................ 375/260

OTHER PUBLICATIONS

Samsung, "Considerations on Codewords to Layers Mapping for Downlink MIMO", 3GPP TSG RAN WG1 #47bis, R1-070130, Jan. 2007, pp. 1-8.*
Dahlman, E., et al., "3G Evolution: HSPA and LTE for Mobile Broadband," First Edition, 2007, pp. 328-333, 336-339, 381-382.
LG Electronics, "Codeword to Layer Mapping for SU-MIMO," 3GPP TSG RAN WG1 #47bis, R1-070235, Jan. 2007, pp. 1-6.
Samsung, "Considerations on Codewords to Layers Mapping for Downlink MIMO," 3GPP TSG RAN WG1 #47bis, R1-070130, Jan. 2007, pp. 1-8.
Ad-Hoc Chairman, "Summary of LTE MIMO Session," 3GPP TSG RAN WG1 #47bis, Jan. 2007, R1-070616, pp. 1-7.
Ericsson, "Extending Codeword to Layer Mapping for Efficient Support of Retransmissions," 3GPP TSG RAN WG1 #50, Aug. 2007, R1-073735, pp. 1-2.

* cited by examiner

*Primary Examiner* — Robert Scheibel
(74) *Attorney, Agent, or Firm* — Potomac Patent Group, PLLC

(57) ABSTRACT

In a transmitter or transceiver, codewords from HARQ processes can be mapped or assigned to various layers for transmission and/or retransmission of information on a radio channel. Exemplary embodiments provide for various mappings which facilitate, for example, HARQ processes. For example, a codeword can be mapped onto a plurality of layers which are equal in number to a channel rank of a radio channel to be used for the transmission.

36 Claims, 11 Drawing Sheets

METHODS AND SYSTEMS FOR CODEWORD TO LAYER MAPPING

RELATED APPLICATION

This application is related to, and claims priority from, Swedish Patent Application No. 0700368-4, filed on Feb. 14, 2007, the disclosure of which is incorporated here by reference.

TECHNICAL FIELD

The present invention generally relates to radio communication systems, devices, software and methods and, more particularly, to mechanisms and techniques for codeword to layer mapping associated therewith.

BACKGROUND

At its inception radio telephony was designed, and used for, voice communications. As the consumer electronics industry continued to mature, and the capabilities of processors increased, more devices became available for use that allowed the wireless transfer of data between devices and more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users (and with more tolerable delay).

Even as new network designs are rolled out by network manufacturers, future systems which provide greater data throughputs to end user devices are under discussion and development. For example, the so-called 3GPP Long Term Evolution (LTE) standardization project is intended to provide a technical basis for radiocommunications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (SC-FDMA).

Modern wireless communication systems targeted for packet-based communication often include hybrid ARQ (HARQ) functionality on the physical layer to achieve robustness against the impairments of the radio channel. LTE and Wideband Code Division Multiple Access (WCDMA) are two examples of systems in which such functionality is available. The basic idea behind HARQ is to combine forward error correction (FEC) with ARQ by encoding the information containing data block and then adding error-detection information such as CRC. After reception of the coded data block, it is decoded and the error-detection mechanism is used to check whether the decoding was successful or not. If the data block was received without error, an ACK message is sent to the transmitter indicating successful transmission of the data block and that the receiver is ready for a new data block. On the other hand, if the data block was not decoded correctly, a NACK message is sent meaning that the receiver expects a retransmission of the same data block. Subsequent to the reception of the retransmission, the receiver may choose to either decode it independently or utilize some or all previous receptions of the same data block in the decoding process.

The channel encoded bits originating from the same block of information bits is typically referred to as a "codeword". This is also the terminology used in the LTE specifications to describe the output intended for a particular subframe from a single HARQ process serving a particular transport block and is the result of processing the information bits by performing, for example, turbo encoding, rate matching, interleaving, etc. Another interesting feature of LTE is its support for multiple antennas at both the transmit side and the receive side. In a multiple transmit antenna device or system, the resulting codewords are then modulated and distributed over the transmit antennas for transmission. The first modulated codeword may, for example, be mapped to the first two transmit antennas and the second, modulated codeword may be mapped to the two remaining transmit antennas in a four transmit antenna system.

Precoding is a popular technique used in conjunction with multi-antenna transmission. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel. Sequences of symbol vectors thus form a set of parallel symbol streams and each such symbol stream is typically referred to as a "layer". Thus, depending on the choice of precoder in a particular implementation, a layer may directly correspond to a certain antenna or a layer may, via the precoder mapping, be distributed onto several antennas (also known as antenna ports). The mechanism by which codewords are assigned to particular layers in such systems is referred to as "mapping" or, more specifically, as "codeword to layer mapping".

In a multi-antenna system (often referred to as a MIMO system), it may be useful to transmit data from several HARQ processes at once, which overall process is also known as multi-codeword transmission. Since the codewords are mapped to layers, the process may alternatively be referred to as multi-layer transmission. Depending on the radio channel conditions, this process can substantially increase the data rates, since in favorable conditions the radio channel can roughly support as many layers as the minimum of the number of transmit and receive antennas. This means that the channel can at most support the simultaneous transmission of a certain number of codewords, and that particular number in turn depends on the codeword to layer mapping. In the simplest case, each codeword maps to a single layer and then the number of supportable layers obviously equals the number of supportable codewords. One of the most significant characteristics associated with the channel conditions in the field of high rate, multi-antenna transmission is the so-called channel rank. The channel rank can vary from one up to the minimum number of transmit and receive antennas. Taking a 4×2 system as an example, i.e., a system or device with four transmit antennas and two receive antennas, the maximum channel rank is two. The channel rank varies in time as the fast fading alters the channel coefficients. Roughly speaking, the channel rank also determines how many layers, and ultimately also how many codewords, can be successfully transmitted simultaneously. Hence, if for example the channel rank is one at the instant of transmission of two codewords which are mapped to two separate layers, then there is a strong likelihood that the two signals corresponding to the codewords will interfere so much that both of the codewords will be erroneously detected at the receiver. The number of layers per channel use (in e.g. LTE a channel use would correspond to a single resource element) that are simultaneously transmitted is sometimes referred to as the transmission rank. With pure spatial precoding schemes such as the spatial multiplexing mode in LTE, the transmission rank equals the number of layers.

In conjunction with preceding, adapting the transmission to the channel rank involves using as many layers as the channel rank. In the simplest of cases, each layer would correspond to a particular antenna. Taking, purely as an example, the current the four transmit antenna case in LTE systems, the maximum number of codewords is limited to two while up to four layers can be transmitted. For devices or systems which have only two transmit antennas, the mapping is relatively straightforward since the number of layers equals the number of codewords. However, for devices and systems having, for example, four or more transmit antennas, there are potentially fewer codewords than layers, so the codewords need to then be mapped to the layers in some predetermined way. The issue then arises regarding how to map the codewords to the layers. Various conventional mappings from codewords to layers have been proposed and will be described in more detail below. Although these conventional mappings work well when considering, for example, first time transmission performance, they may not be optimal under other circumstances, e.g., when considering the efficiency of HARQ operation for retransmissions.

Accordingly, it would be desirable to provide other codeword to layer mappings for systems, methods, devices and software which avoid the afore-described problems and drawbacks.

SUMMARY

According to an exemplary embodiment, a method for transmitting an information signal on a radio channel using hybrid automatic retransmission request (HARQ) codewords includes generating codewords, one for each HARQ process available for simultaneous transmission, mapping the codewords onto a first plurality of layers to generate the information signal having a first transmission rank, initially transmitting the information signal on the radio channel, and subsequently retransmitting, with a second transmission rank on the radio channel, using one of the HARQ processes by generating one of the codewords mapped to a second plurality of layers.

According to another exemplary embodiment, a transmitter for transmitting an information signal on a radio channel using hybrid automatic retransmission request (HARQ) codewords includes a plurality of transmit antennas, a processor for generating codewords, one for each HARQ process available for simultaneous transmission and for mapping the codewords onto a first plurality of layers to generate the information signal having a first transmission rank, a transmit chain of elements for transmitting the information signal, further wherein the processor subsequently maps one of the two codewords onto a second plurality of layers and the transmit chain of elements retransmits the one of the two codewords on the radio channel.

According to another exemplary embodiment, a method for receiving an information signal which was transmitted using hybrid automatic retransmission request (HARQ) codewords includes receiving the information signal, determining a first mapping between the codewords and a first plurality of layers used to generate the information signal having a first transmission rank, decoding the information signal using knowledge of the first mapping, receiving retransmission of at least part of the information signal having a second transmission rank, determining a second mapping between at least one of the codewords and a second plurality of layers, and decoding the at least part of the retransmitted information signal using knowledge of the second mapping.

According to still another exemplary embodiment, a receiver for receiving an information signal on a radio channel which was transmitted using hybrid automatic retransmission request (HARQ) codewords includes at least one receive antenna for receiving said information signal, a receive chain of elements connected to the at least one receive antenna for processing the information signal, and a processor for determining a first mapping between the codewords and a first plurality of layers used to generate the information signal having a first transmission rank and decoding the information signal using knowledge of said first mapping, wherein the at least one receive antenna subsequently receives a retransmission of at least part of the information signal having a second transmission rank and the processor determines a second mapping between at least one of the codewords and a second plurality of layers and decodes the at least part of the retransmitted information signal using knowledge of the second mapping.

According to still another exemplary embodiment, a method for transmitting an information signal on a radio channel using hybrid automatic retransmission request (HARQ) codewords includes generating an HARQ codeword, mapping the HARQ codeword onto a plurality of layers based on a channel rank of the radio channel to generate the information signal, wherein the channel rank is greater than one and the plurality of layers is equal to the channel rank, and transmitting the information signal on the radio channel.

According to another exemplary embodiment, a transmitter for transmitting an information signal on a radio channel using hybrid automatic retransmission request (HARQ) codewords includes a plurality of transmit antennas, a processor for generating an HARQ codeword and mapping the HARQ codeword onto a plurality of layers based on a channel rank of the radio channel to generate the information signal, wherein the channel rank is greater than one and the plurality of layers is equal to the channel rank, and a transmit chain of elements for transmitting the information signal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
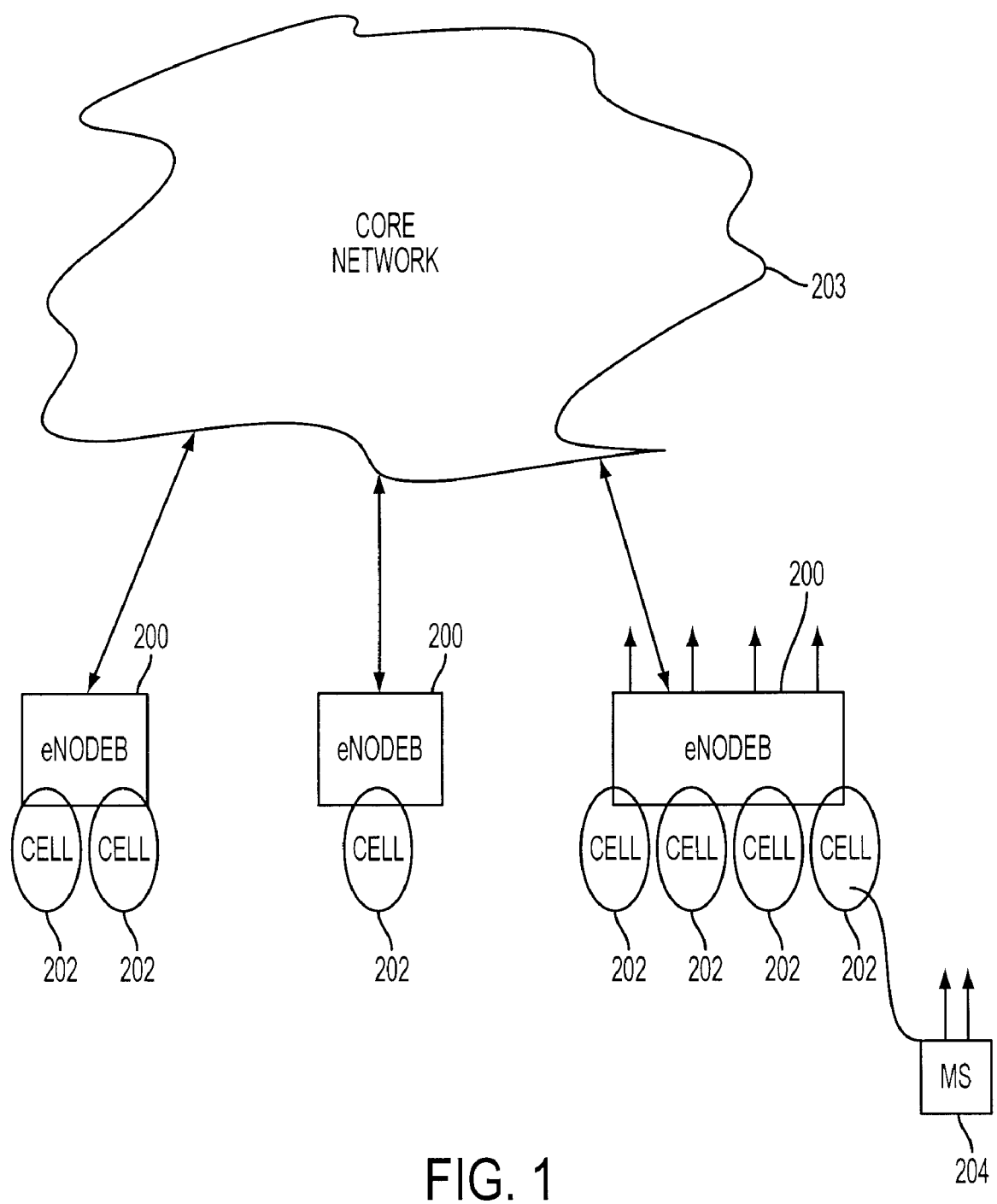
FIG. 1 illustrates an exemplary LTE access network in which exemplary embodiments can be implemented.
Figure 2:
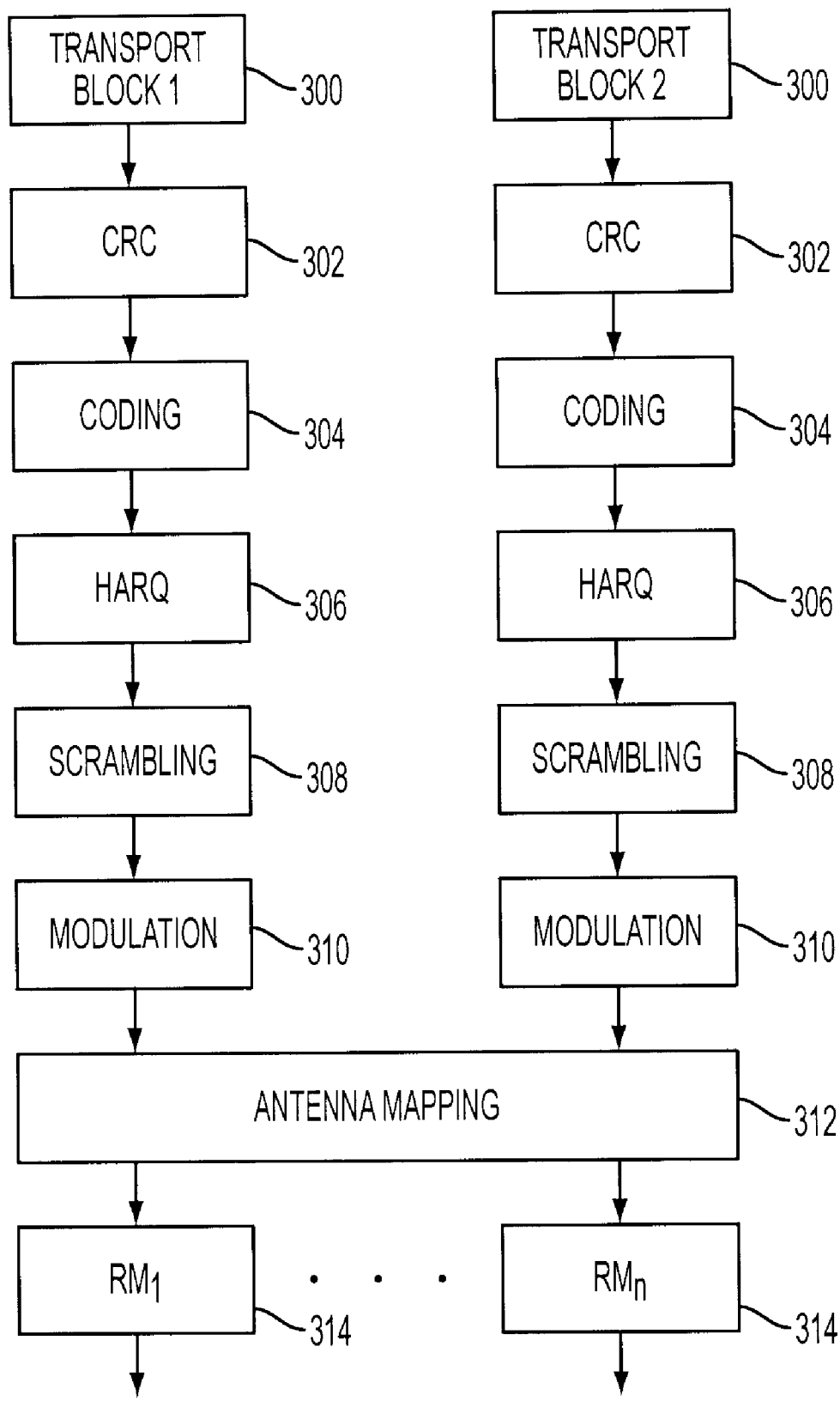
FIG. 2 depicts exemplary LTE physical layer information signal processing with which exemplary embodiments can be associated.
Figure 3:
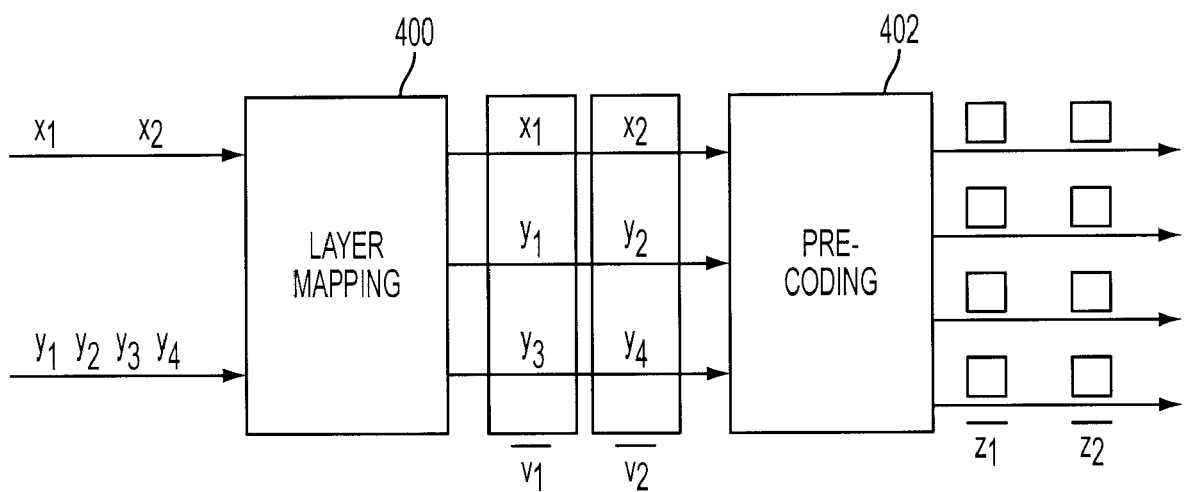
FIG. 3 shows an example of an antenna mapping function in more detail.

To provide some context for the more detailed discussion of codeword to layer mappings according to these exemplary embodiments, consider first the exemplary radiocommunication system illustrated in FIGS. 1-3. Beginning with the radio access network nodes and interfaces in FIG. 1, it will be seen that this particular example is provided in the context of LTE systems. Nonetheless, the present invention is not limited in its applicability to transmitters or transmissions associated with LTE systems and can instead be used in any system wherein multiple transmit antennas are employed, including, but not limited to Wideband Code Division Multiple Access (WCDMA), GSM, UTRA, E-UTRA, High Speed Packet Access (HSPA), UMB, WiMaX and other, systems, devices and methods. Since, however, the example in FIG. 1 is provided in terms of LTE, the network node which transmits and receives over the air interface is termed an eNodeB, several of which eNodeBs 200 are illustrated therein.

In the context of the air interface, each eNodeB 200 is responsible for transmitting signals toward, and receiving signals from, one or more cells 202. Each eNodeB includes multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. Note that, as used herein, the phrase "transmit antennas" is specifically meant to include, and be generic to, physical antennas, virtual antennas and antenna ports. The eNodeBs 200 are also responsible for many higher functions associated with handling communications in the system including, for example, scheduling users, handover decisions, and the like. The interested reader who desires more information regarding transmit or receive functions associated with LTE or other systems in which these exemplary embodiments may be deployed is directed toward the book entitled "3G Evolution—HSPA and LTE for Mobile Broadband", to Erik Dahlman et al., published by Elsevier Ltd., 2007, the disclosure of which is incorporated by reference.

Nonetheless, to briefly discuss the baseband processing associated with the transmission of signals in the downlink (i.e., possibly transferred through the core network 203 to an eNodeB 200 and then into the cells 202 toward target mobile terminal or stations, e.g., MS 204 in FIG. 1), consider FIG. 2. Therein, two transport blocks of data 300 are being processed for transmission by an eNodeB 200 using spatial multiplexing. Cyclic redundancy check (CRC) bits are inserted at steps 302 to be used by the receiver to detect errors. Channel coding is applied to the transport blocks at steps 304 to provide protection to the payload data against the impairments presented by the radio channel. The hybrid automatic retransmission request (HARQ) steps 306 operate to extract or repeat code bits from the blocks of code bits provided by the channel encoder to generate a precise set of bits to be transmitted within a transmit time interval (TTI), e.g., based upon various criteria such as the number of assigned resource blocks, the selected modulation scheme and the spatial multiplexing order. This means that not necessarily the same coded bits are produced from the HARQ steps 306 for each transmission attempt of the same transport block of information bits. The signals corresponding to a TTI are in LTE transmitted over a so-called subframe which spans 1 ms.

At step 308, the code words output from the HARQ block are scrambled (multiplied) by a bit-level scrambling sequence or mask, which aids the receive in suppressing interference to the radio signal. The selected data modulation, e.g., Quadrature Phase-Shift Keying (QPSK), 16 Quadrature Amplitude Modulation (QAM), or 64 QAM, is then applied at step 310 to transform blocks of scrambled bits into corresponding blocks of modulation symbols. These modulation symbols are then mapped to different antennas and/or different antenna ports at step 312. In LTE nomenclature, an antenna port corresponds to the transmission of a particular downlink reference signal which may, or may not, correspond to an actual, physical antenna. The symbols to be transmitted on each antenna (1-n in FIG. 2, e.g., 2, 4, 8, 16) are then mapped to respective resource blocks 314 and sent off for OFDM processing (not shown) prior to transmission by the eNodeB 200.

Of particular interest in the transmit processing for these exemplary embodiments is the antenna mapping step/block 312. The antenna mapping process can be further subdivided into mapping of the codewords output from the modulation block 310 into layers and precoding of the resulting symbol vectors to generate the antenna (or antenna port) mapped symbols, as shown in FIG. 3. Therein an example is provided with two sets of codewords being mapped by layer mapping function 400 into three layers. Two symbol vectors v1 and v2 associated with the three layers are illustrated in FIG. 3. These symbol vectors are then precoded by applying one or more precoding matrices by precoding function 402, i.e., by matrix multiplication of the precoding matrix or matrices with the incoming symbol vectors. A detailed description of precoding is beyond the scope of this discussion. However, it will be appreciated that the illustration of mapping to three layers and four transmit antennas in FIG. 3 is purely exemplary, and that these exemplary embodiments are applicable to other numbers of layers and/or transmit antennas. Selection of the number of layers will (i.e., the transmission rank), as described earlier, typically vary based upon the channel rank (among possibly other criteria) and the number of antennas may vary from system to system or even among transmit devices within systems.

For any given system, device or implementation, there will typically be a fixed number of transmit antennas and, therefore, one or more predetermined mappings between codewords and layers will typically be available for use in performing the codeword to layer mapping illustrated in, e.g., FIG. 3. This mapping can change during operation of a particular transmitter or device as a function of the determined channel rank, i.e., codewords can be mapped to more or fewer layers during transmission to another device. Some conventional sets of codeword to layer mappings for systems or devices with four transmit antennas are illustrated in FIGS. 4 and 5. For example, FIGS. 4(a)-4(d) depict a first set of conventional codeword to layer mappings. Starting with FIG. 4(a), if for example, the channel conditions are determined to correspond to a transmission rank 1 characteristic, then a single codeword 500 is mapped to a single layer 502. The layer 502 is input to a precoder 504, which precodes the symbols and distributes them across the four transmit antennas 506-512.

Figure 4A:
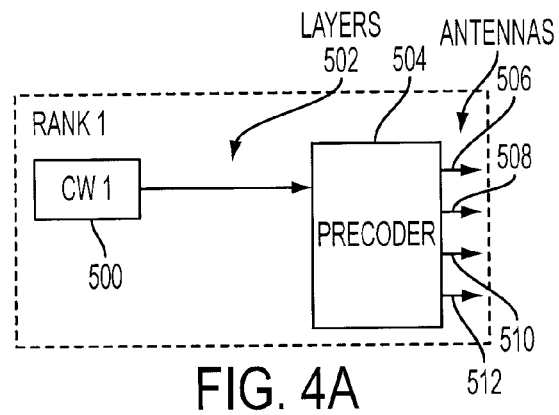
FIGS. 4(a)-4(d) illustrate a first conventional set of codeword to layer mappings.
Figure 4B:
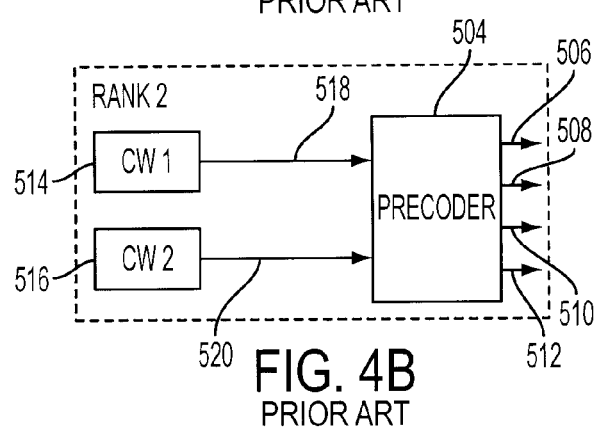
Figure 4C:
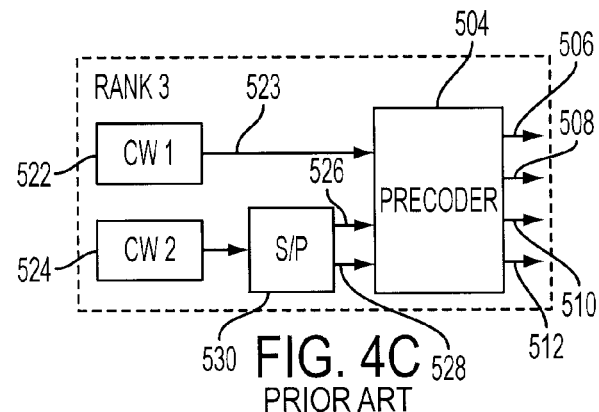

For a rank 2 channel, transmission rank 2 is suitable and the codeword to layer mapping can be performed, for example, as shown in FIG. 4(b). Therein, two codewords 514 and 516 are mapped to two layers 518 and 520, respectively. These two layers 518 and 520 provide their respective symbol streams to the precoder 504, which in turn precodes the symbols and distributes them among the four transmit antennas 506-512. For a rank 3 channel, transmission rank 3 may be used, which is illustrated in FIG. 4(c) where a first codeword 522 is mapped to one layer 523, while a second codeword 524 is mapped to two layers 526 and 528 using a serial-to-parallel (S/P) converter 530. The three resulting layers are then precoded and their symbols distributed among the four transmit antennas 506-512. For a rank 4 channel, a transmitter can use the codeword to layer mapping illustrated in FIG. 4(d). Therein, two codewords 532 and 534 are each mapped into two different layers, i.e., layers 536 and 538 for codeword 532 and layers 540 and 542 for codeword 534 via S/P converters 544 and 546, respectively. The resulting four layers are then precoded by unit 504 and their symbols distributed among the four transmit antennas 506-512.

Figure 4D:
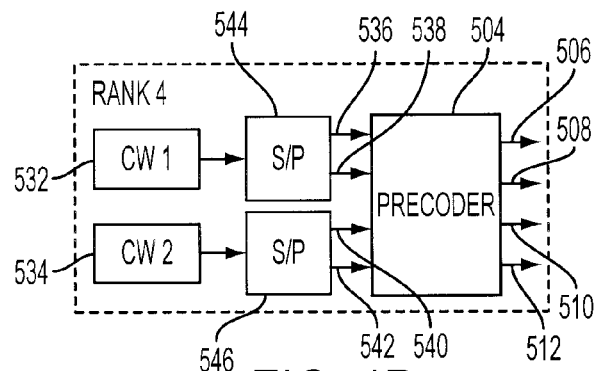
Figure 5A:
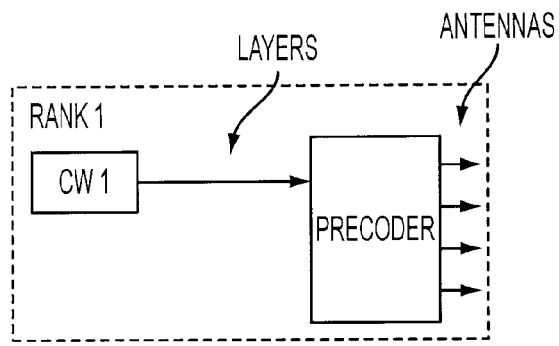
FIGS. 5(a)-5(d) illustrate a second conventional set of codeword to layer mappings.
Figure 5B:
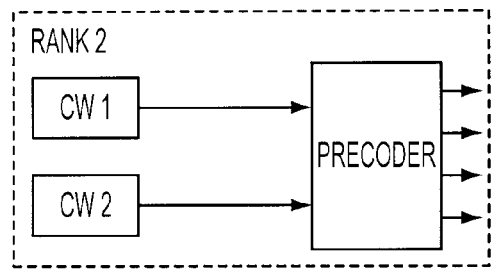
Figure 5C:
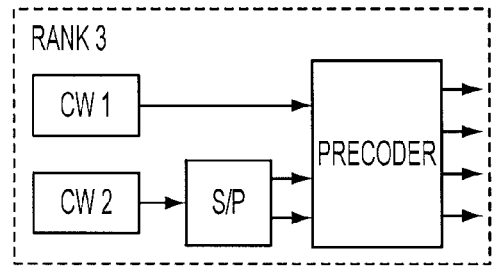
Figure 5D:
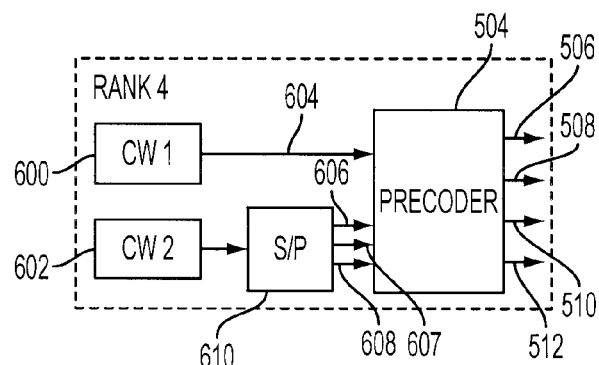

Another conventional codeword to layer mapping set is illustrated in FIGS. 5(a)-5(d). Therein, the mappings of codewords to layers for ranks 1-3, illustrated in FIGS. 5(a)-5(c) is the same as that described above for the previous, conventional mapping set in FIGS. 4(a)-4(c) and are, therefore, not further described here. However the mapping for a rank 4 channel characteristic is different. Instead of mapping the two codewords each to two different layers (as shown in FIG. 4(d)), this conventional mapping set maps a first codeword 600 to one layer 604 and the second codeword 602 to three different layers 606, 607 and 608 via an S/P unit 610. The resulting layers are then precoded via unit 504 and their symbols are distributed across the four transmit antennas 506-512. This particular mapping has been claimed to be beneficial for increasing the accuracy of the channel quality reporting from the receiver when certain advanced types of receiver employing successive interference cancellation techniques are employed.

The conventional codeword to layer mappings described above with respect to FIGS. 4(a)-5(d) work well and incur a relatively small performance loss compared to all possible mappings if only first time transmission performance is considered. However, if retransmissions e.g., as part of the above-described HARQ processing, are taken into account, then other mappings may be desirable. For example, suppose that at a particular time, a transmitter/transceiver determines that the radio channel on which it is transmitting information has a channel rank of four. The transmitter/transceiver then uses, for example, the conventional mapping depicted in FIG. 4(d) for the initial/first transmission of a block of data, and hence two codewords are mapped onto four layers as shown in FIG. 4(d). Further, suppose that subsequently one or both of the transmitted codewords are not detected correctly at the receiver, in which case the transmitter is requested to resend the information contained in these two codewords. However, by the time of the retransmission of these codewords, the channel has changed its rank, e.g., from rank four to rank two, making it typically impossible to successfully simultaneously convey two codewords mapped to four layers. There is thus a need for the transmitter to reduce the transmission rank (i.e., to reduce the number of layers used for transmission) and to only transmit symbols from a single codeword at a time. Given, the set of conventional codeword to layer mappings shown in FIGS. 4(a)-4(d), however, in order to use only two layers, two codewords must be used, i.e., as shown in FIG. 4(b).

It is thus not possible, using the conventional, predetermined mapping set provided in FIGS. 4(a)-4(d), to use two layers for transmission when only symbols from a single codeword need to be transmitted. Thus, the transmitter would have to retransmit the codeword using only a single layer. A similar problem exists with respect to the conventional mapping set illustrated in FIGS. 5(a)-5(d). This, in turn, precludes chase combining at the receive side and also means that retransmissions are limited to half as many coded bits as the original transmission. For first transmissions with high coding rates, this can represent a substantial loss of coding gain.

The problem described above with respect to the conventional codeword to layer mappings of FIGS. 4(a)-5(d) may have a serious impact on the efficiency of HARQ operation. For example, using these conventional mappings for retransmission, either the transmitter keeps all four of the original layers and accurate reception of the retransmitted data is likely to fail due to poorer channel conditions, or a single codeword at a time is transmitted using only a single layer. However, in the latter case it is likely that the coded, rate-matched and interleaved bits in the HARQ buffer do not fit when fewer layers are available. Thus, at best, the rate-matching and interleaving may need to be repeated, but at worst the underlying number of information bits does not fit when fewer layers have to be used, or at least the code rate becomes excessively high. Similar problems arise if one of the HARQ processes is terminated earlier than the other one and the channel rank then drops to one.

A solution to this problem according to exemplary embodiments is to provide additional or alternative codeword to layer mappings which enable a transmitter/transceiver to be able to reduce the number of simultaneously transmitted codewords (or HARQ processes) without being forced to change the number of layers corresponding to any of the remaining codeword(s) (or HARQ process(es)). Mappings which support this capability can be added solely for use in retransmissions or can also be available for use by a transmitter in the first time transmission of data. For example, when considering the codeword to layer mappings as depicted in FIGS. 4(a)-4(d), moving from rank four to rank two transmissions currently forces each codeword to use one layer each. To avoid that issue, one or more additional mappings involving a single codeword to two (or more) layers can be provided for different channel ranks.

Figure 6A:
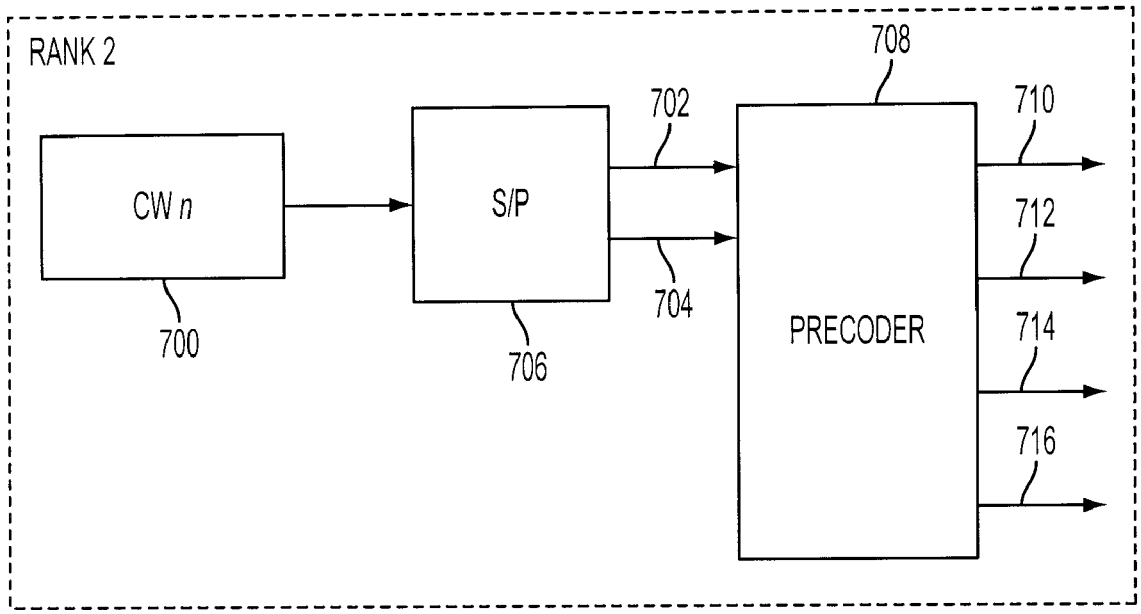
FIGS. 6(a) and 6(b) illustrate codeword to layer mappings according to exemplary embodiments.
Figure 6B:
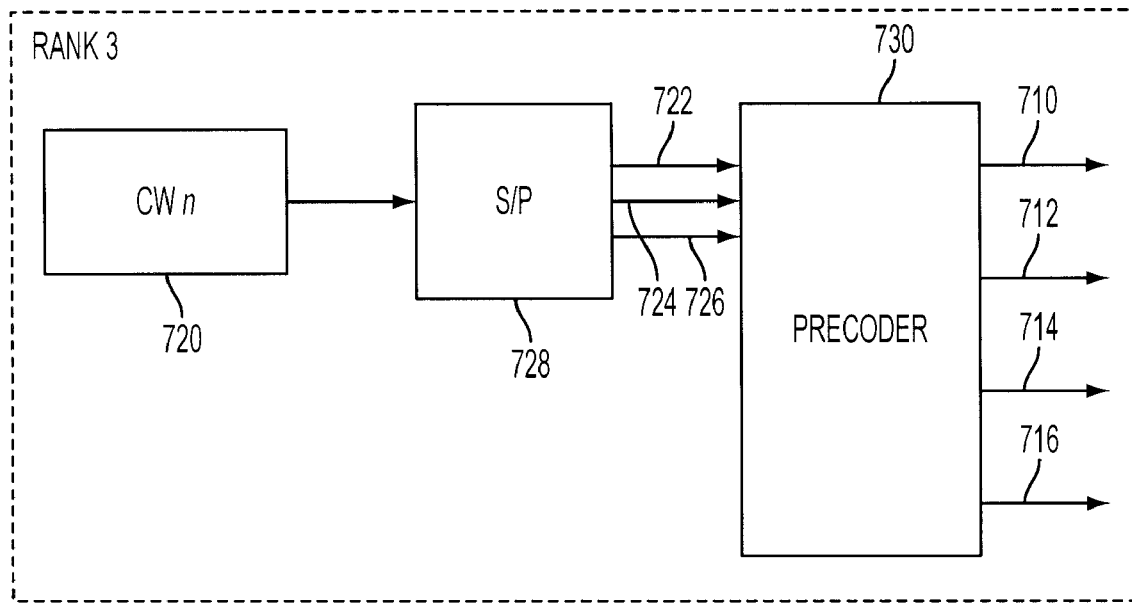

One such mapping according to an exemplary embodiment is illustrated in FIG. 6(a). Therein, for a rank 2 radio channel, a single codeword 700 is mapped to two layers 702 and 704 via S/P unit 706. The resulting layers have their symbols precoded by unit 708 and then distributed among the transmit antennas 710-716. The parameter n which further identifies the codeword 700 in FIG. 6(a) denotes the codeword number and is set to either one or two, e.g., if the mapping of FIG. 6(a) is used by a transmitter to retransmit a codeword 2 which was originally transmitted using the mapping of, e.g., FIG. 4(d), then n would equal 2. According to another exemplary embodiment, illustrated in FIG. 6(b), a mapping of a single codeword to three layers for a rank 3 radio channel can also or alternatively be provided to a codeword to layer mapping set. Therein, a codeword 720 is mapped to three different layers 722, 724 and 726 using an S/P unit 728. The resulting three layers are input to the precoding unit 730, which precodes the symbols and distributes them among the, in this example, four transmit antennas 710-716.

In these codeword to layer mappings according to the exemplary embodiments, the precoding unit 708, 730 can be responsible for the ordering of the layers 702 and 704 or 722, 724 and 726, respectively. Thus, different layer orderings are not explicitly referenced in FIGS. 6(a) and 6(b) although it would be straightforward to do so. Also, it will be apparent that, for retransmissions, the codeword number can change for any given mapping. The exemplary mappings illustrated in FIGS. 6(a) and 6(b) can be used as part of the either of the mapping sets illustrated in FIGS. 4(a)-5(d) either individually or together to extend those mapping sets or they can be used with other mapping sets.

Adding additional mappings to existing mapping sets may, in turn, impose a need to signal the receiver regarding which mapping is being used by a transmitter for a given codeword or data block. In LTE, the receiver (UE) will, e.g., based on channel measurements, recommend a certain transmission rank and precoder to the eNodeB. For transmission ranks where there is only one possible mapping, the recommendation of a transmission rank by the receiver implicitly determines the codeword to layer mapping. An alternative is that the UE would explicitly recommend a codeword to layer mapping from which the transmission rank is implicitly derived, e.g., by signaling such a recommendation to the eNodeB. The eNodeB may choose to follow the transmission rank recommendation or override it. In any case, the eNodeB can signal, i.e., in the downlink to the UE, which mapping/ transmission rank is used to transmit thereto. There are several alternatives which can be used to signal what specific mapping should be used and in particular how to add the extended mappings. The signaling should preferably be considered jointly together with, for example, the signaling of the precoding index and would in LTE probably be placed on the physical downlink control channel (PDCCH). In any case, one exemplary way of adding support for the additional mappings is to let the transport format size field in the PDCCH, which describes the number of information bits in a codeword, be set to zero when that codeword should remain unused such that the corresponding layers are not transmitted.

Figure 7:
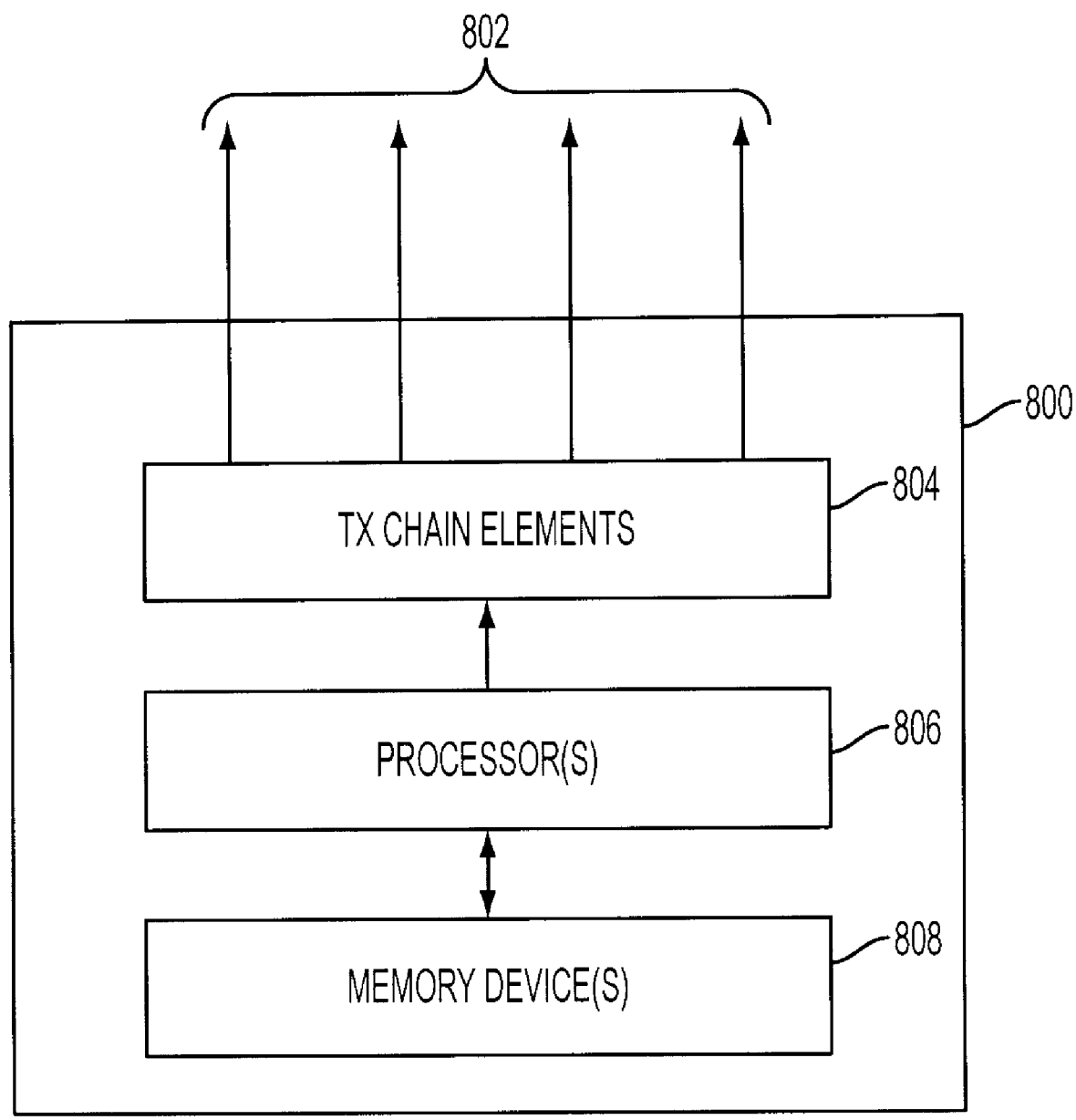
FIG. 7 is a block diagram of an exemplary transmitting device in which codeword to layer mappings according to these exemplary embodiments can be implemented.

As mentioned above, the transmit processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The transmitter/transceiver may, for example, be disposed within a radio base station, NodeB, eNodeB, or the like, to transmit information signals on a downlink radio channel. Alternatively, the transmitter may, for example, be disposed in a mobile unit, terminal device, user equipment, or the like to transmit information signals on an uplink radio channel. Regardless of the particular type of communication system in which these exemplary embodiments are presented, the transmit device will typically include the components illustrated generally in FIG. 7.

Therein, the transmitter includes a plurality of physical transmit antennas 802 in this example numbering four, although more or fewer than four transmit antennas can be used. The physical transmit antennas 802 are connected to a processor 806 via transmit (TX) chain elements 804 which can include one or more of filters, power amplifiers and the like, as will be appreciated by those skilled in the art. Processor(s) 806, in conjunction with memory device(s) 808 (and potentially other devices not shown) can operate to perform the transmit processes discussed above with respect to FIGS. 1-3, e.g., by way of software stored therein, additional hardware or some combination of software and hardware. Thus, the codeword to layer mapping functionality described above can, for example, be performed in software by executing computer-readable instructions from memory device 808 to perform, e.g., the mappings described above with respect to FIGS. 6(a) and 6(b). Thus, it will be apparent that exemplary embodiments also relate to software, e.g., program code or instructions which are stored on a computer-readable medium and which, when read by a computer, processor or the like, perform certain steps associated with transmitting information signals whose HARQ codewords are mapped to layers in the manner described above. Examples of such steps are illustrated in the flowcharts of FIGS. 8 and 9.

Figure 8:
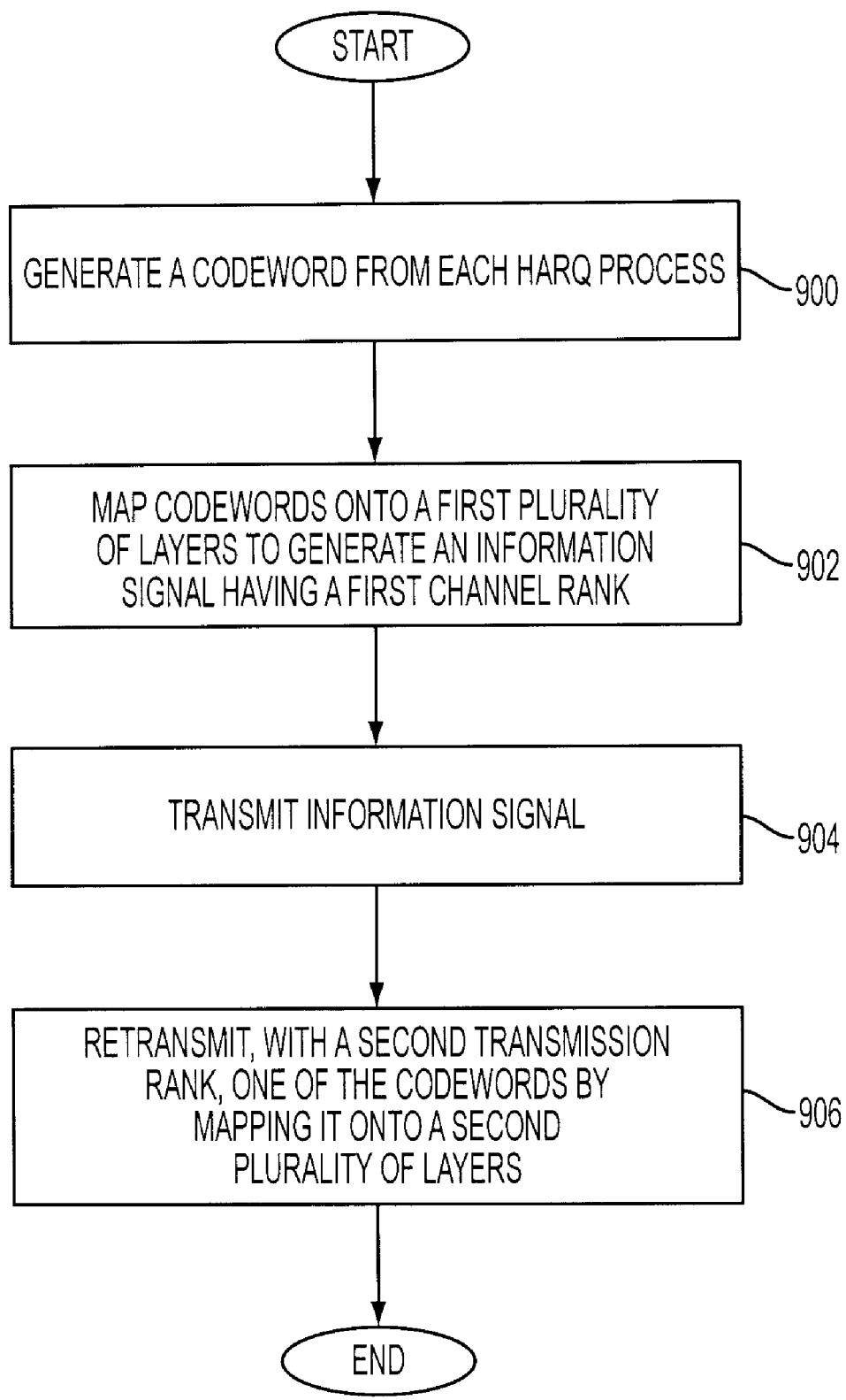
FIGS. 8 and 9 are flowcharts illustrating methods of transmitting according to exemplary embodiments.

A method of transmitting an information signal, including retransmission of, e.g., an erroneously received codeword, according to an exemplary embodiment is illustrated in FIG. 8. Therein, at step 900, codewords are generated, i.e., one from each of the, e.g., two, HARQ processes. The codewords are mapped onto a first plurality of layers corresponding to a first transmission rank, i.e., the number of layers equals the transmission rank, based on, e.g., the channel rank perceived by the transmitter at the time of first transmission of this data, at step 902 to generate an information signal. The information signal is then transmitted on the radio channel at step 904. Subsequently, at step 906, one of the HARQ processes is ordered to retransmit, and a corresponding codeword is produced and retransmitted, e.g., due to erroneous reception by a receiver of the first transmission of a codeword associated to the HARQ process being ordered to retransmit. The codeword to be retransmitted is mapped onto a second plurality of layers and transmitted at a second transmission rank, e.g., associated with the channel conditions perceived by the transmitter at the time of the retransmission.

Figure 9:
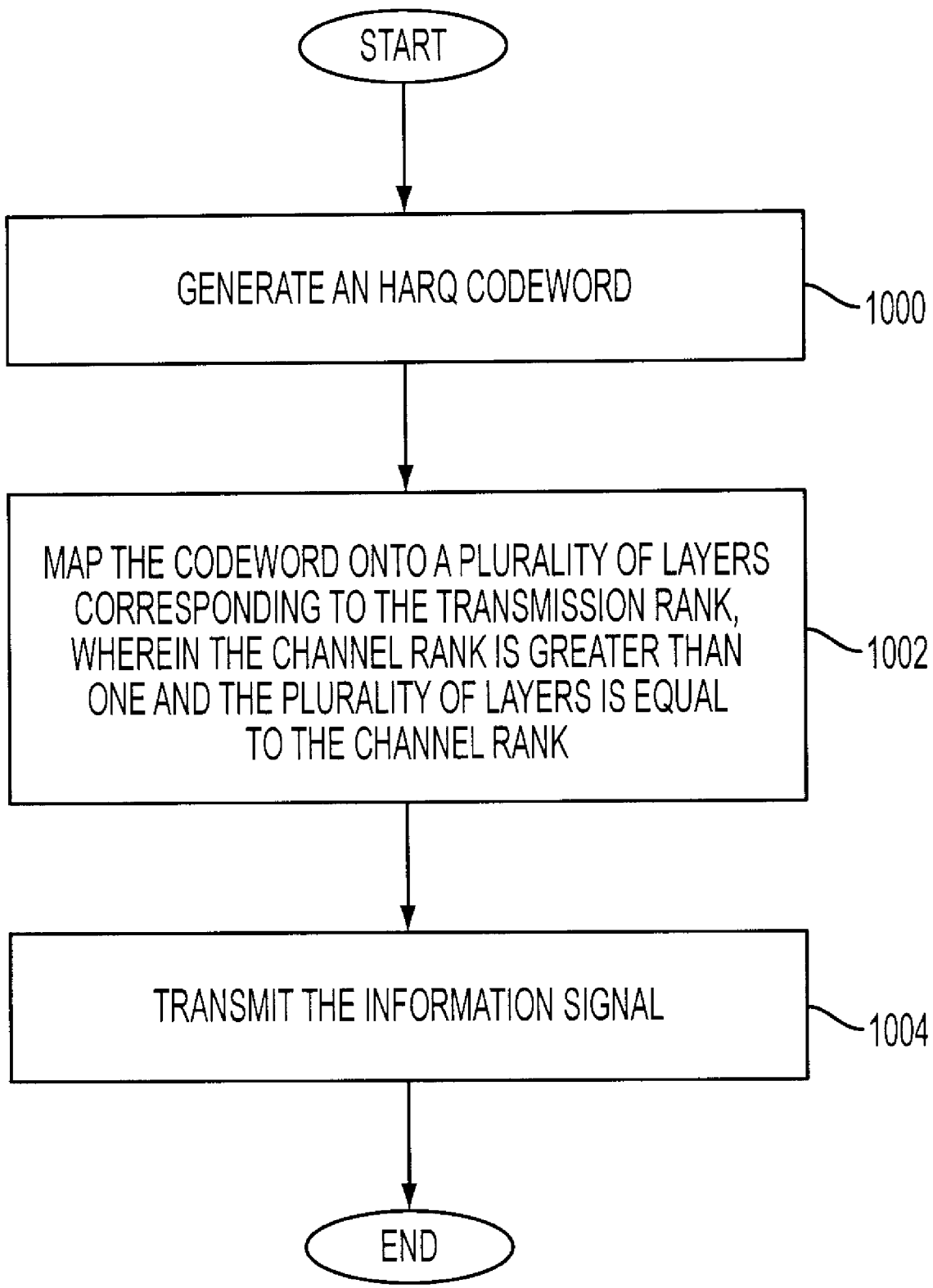

A method of transmitting an information signal, which may or may not include retransmission, according to an exemplary embodiment is illustrated in FIG. 9. Therein, at step 1000, a codeword out of a HARQ process is generated. This codeword is mapped, at step 1002, onto a plurality of layers corresponding to a transmission rank, e.g. based on a channel rank of the radio channel, to generate the information signal, wherein the transmission rank is greater than one and the number of layers is equal to the transmission rank. The resulting information signal is then transmitted at step 1004.

Figure 10:
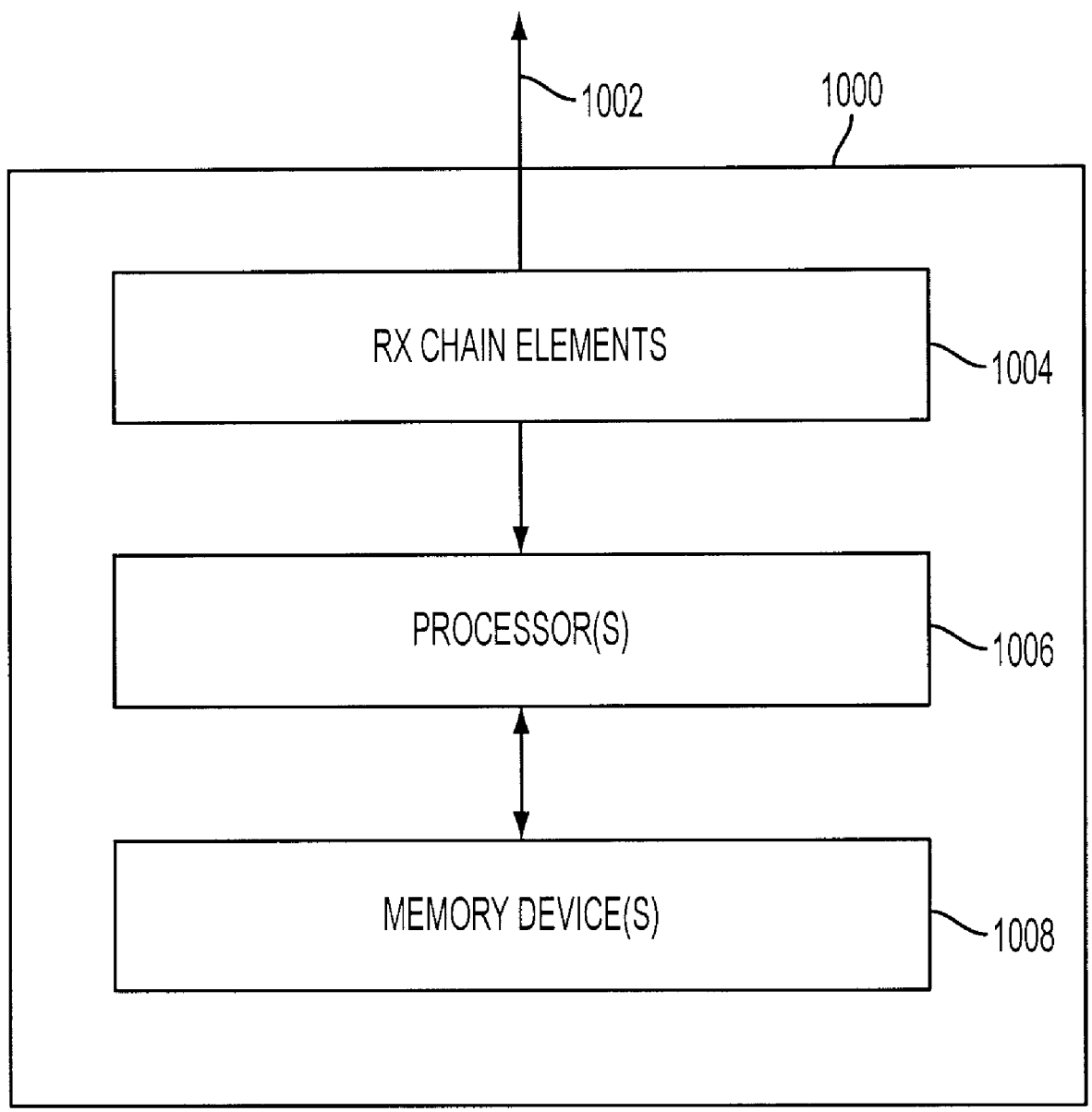
FIG. 10 is a block diagram of an exemplary receiving device in which knowledge of codeword to layer mappings according to these exemplary embodiments is used.

As mentioned above, it is contemplated that receivers of signals processed for transmission as described above will need to consider the particular codeword to layer mapping used for transmission in order to decode the received signal. Thus, an exemplary receiver 1000 for receiving and processing information signals which have been codeword to layer mapped as described above is illustrated in FIG. 10. Therein, one (or more) receive antennas 1002 receive the information signals which have been codeword to layer mapped during transmit side processing. After passing through one or more receive (RX) chain processing elements 1004 (e.g., filters, amplifiers or the like), processor(s) 1006 will process the received information signals to extract the information contained therein, e.g., in conjunction with processing software stored on memory device(s) 1008, by using its knowledge of the codeword to layer mapping performed on those information signals.

Figure 11:
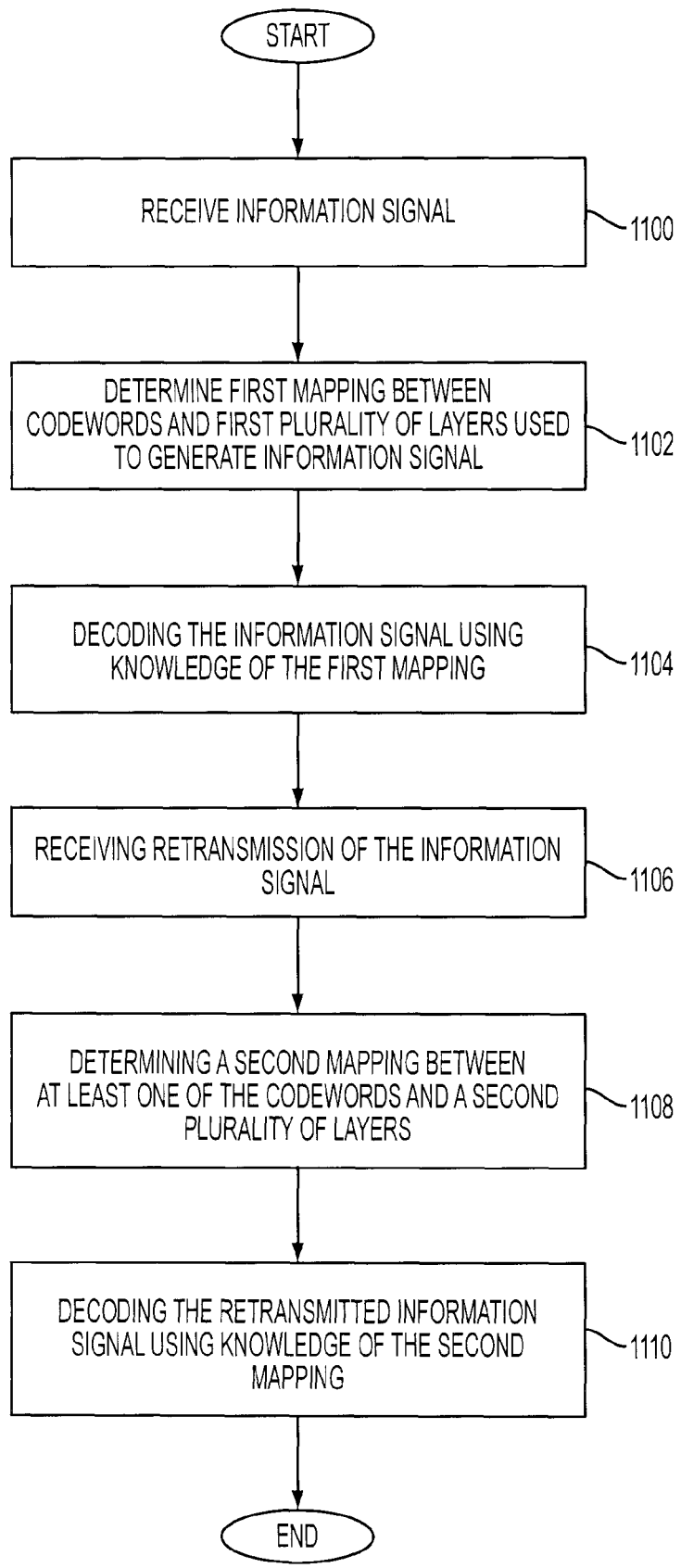
FIG. 11 is a flowchart illustrating a method of receiving according to an exemplary embodiment.

For example, as shown in the flowchart of FIG. 11, a method for receiving an information signal which was transmitted using hybrid automatic retransmission request (HARQ) codewords can include the steps of receiving the information signal 1100 and determining a first mapping between the codewords and a first plurality of layers that was used to generate the information signal having a first transmission rank (step 1102). Using this mapping knowledge, the receiver can then decode the received information at step 11104. A retransmission of at least part of the information signal, at a second transmission rank, then occurs at step 1106. The receiver can then determine a second mapping between at least one of the codewords and a second plurality of layers (step 1108) and use that knowledge to decode the retransmitted information signal at step 1110.

The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for transmitting an information signal on a radio channel using hybrid automatic retransmission request (HARQ) codewords comprising:
   generating at least two codewords, one for each HARQ process available for simultaneous transmission;
   mapping said at least two codewords onto a first plurality of layers to generate said information signal having a first transmission rank, wherein at least one of said at least two codewords is mapped to at least two layers;
   initially transmitting said information signal on said radio channel; and
   subsequently retransmitting a block of information bits in one of the at least two codewords that was mapped to at least two layers, with a second transmission rank on said radio channel, wherein the second transmission rank is at least two, and wherein the second transmission rank is reduced compared to the first transmission rank, using one of said HARQ processes, the retransmitting comprising the steps of:
   generating one retransmission codeword based on said block of information bits in said one of the at least two codewords;
   mapping said retransmission codeword to a second plurality of layers, and transmitting said retransmission codeword at said second transmission rank,
   wherein the second plurality of layers are fewer than the first number of layers and the same number of layers that said one of the at least two codewords was mapped to in the initial transmission, and wherein said second plurality of layers corresponds to as many layers as said second transmission rank.

2. The method of claim 1, wherein said second transmission rank is equal to two.

3. The method of claim 2, wherein said first transmission rank is four.

4. The method of claim 2, wherein said first transmission rank is three.

5. The method according to claim 1, wherein there are two HARQ processes available for said simultaneous transmission.

6. The method according to claim 1, wherein said second transmission rank during said retransmission is determined based on a channel rank of said radio channel.

7. The method according to claim 1, wherein each of said codewords comprise a plurality of channel encoded bits originating from a block of information bits.

8. The method according to claim 1, wherein said first plurality of layers are symbol streams which are input in parallel to a precoder to generate said information signal.

9. The method of claim 8, further comprising:
   distributing symbols associated with said information signal across a plurality of transmit antennas for transmission.

10. The method of claim 9, wherein said number of transmit antennas is four.

11. A transmitter for transmitting an information signal on a radio channel using hybrid automatic retransmission request (HARQ) codewords comprising:
    a plurality of transmit antennas;
    a processor for generating at least two codewords, one for each HARQ process available for simultaneous transmission, wherein said processor is adapted to map said at least two codewords onto a first plurality of layers to generate said information signal having a first transmission rank, said processor being further adapted to map at least one of said at least two codewords to at least two layers;
    a transmit chain of elements for transmitting said information signal,
    further wherein said processor is adapted to subsequently generate one retransmission codeword based on a block of information bits in one of the at least two codewords that was mapped to at least two layers;
    said processor being further adapted to map said retransmission codeword onto a second plurality of layers to generate a retransmission signal having a second transmission rank, wherein said second transmission rank is at least two, and wherein said second transmission rank is reduced compared to said first transmission rank,
    wherein the second plurality of layers are fewer than the first plurality of layers and the same number of layers that said one of the at least two codewords was mapped to in the first transmission, and wherein said second plurality of layers corresponds to as many layers as said second transmission rank; and
    said transmit chain of elements being adapted to transmit said retransmission signal on said radio channel.

12. The transmitter of claim 11, wherein said second transmission rank is equal to two.

13. The transmitter of claim 12, wherein said first transmission rank is four.

14. The transmitter of claim 12, wherein said first transmission rank is three.

15. The transmitter according to claim 11, wherein there are two HARQ processes available for said simultaneous transmission.

16. The transmitter according to claim 11, wherein said processor is further adapted to determine said second transmission rank based on a channel rank of said radio channel.

17. The transmitter according to claim 11, wherein each of said codewords comprise a plurality of channel encoded bits originating from a block of information bits.

18. The transmitter according to claim 11, wherein said first plurality of layers are symbol streams, and wherein said processor is further adapted to input said symbol streams in parallel to a precoder to generate said information signal.

19. The transmitter of claim 18, wherein said symbols associated with said information signal are distributed across said plurality of transmit antennas for transmission.

20. The transmitter of claim 19, wherein said number of transmit antennas is four.

21. A method for receiving an information signal which was transmitted using at least two hybrid automatic retransmission request (HARQ) codewords comprising:
   receiving said information signal;
   determining a first mapping between said at least two codewords and a first plurality of layers used to generate said information signal having a first transmission rank, wherein at least one of said at least two codewords is mapped to at least two layers;
   decoding said information signal using knowledge of said first mapping;
   receiving a second information signal which was transmitted using a retransmission codeword, based on a block of information bits in one of the at least two codewords that was mapped to at least two layers, said second information signal having a second transmission rank, wherein the second transmission rank is at least two, and wherein the second transmission rank is reduced compared to the first transmission rank;
   determining a second mapping between said retransmission codewords and a second plurality of layers, wherein the second plurality of layers are fewer than the first plurality of layers and the same number of layers that said one of the at least two codewords was mapped to in the initial received information signal, and wherein said second plurality of layers corresponds to as many layers as said second transmission rank; and
   decoding said at least part of said retransmitted information signal using knowledge of said second mapping.

22. The method of claim 21, wherein said second transmission rank is equal to two.

23. The method of claim 22, wherein said first transmission rank is four.

24. The method of claim 22, wherein said first transmission rank is three.

25. The method according to claim 21, wherein there are two HARQ processes available for said simultaneous transmission.

26. The method according to claim 21, wherein said second transmission rank is determined based on a channel rank of said radio channel.

27. The method according to claim 21, wherein each of said codewords comprise a plurality of channel encoded bits originating from a block of information bits.

28. The method according to claim 21, wherein said first plurality of layers are symbol streams which are input in parallel to a precoder to generate said information signal.

29. A receiver for receiving an information signal on a radio channel which was transmitted using at least two hybrid automatic retransmission request (HARQ) codewords comprising:
   at least one receive antenna for receiving said information signal;
   a receive chain of elements connected to said at least one receive antenna for processing said information signal; and
   a processor for determining a first mapping between said at least two codewords and a first plurality of layers used to generate said information signal having a first transmission rank, wherein at least one of said at least two codewords is mapped to at least two layers, said processor being further adapted to decode said information signal using knowledge of said first mapping, wherein:
   said at least one receive antenna is adapted to receive a second information signal which was transmitted using a retransmission codeword, based on a block of information bits in one of the at least two codewords that was mapped to at least two layers, said second information signal having a second transmission rank, wherein the second transmission rank is at least two, and wherein the second transmission rank is reduced compared to the first transmission rank; and
   said processor is further adapted to determine a second mapping between said retransmission codewords and a second plurality of layers, wherein the second plurality of layers are fewer than the first plurality of layers and the same number of layers that said one of the at least two codewords was mapped to in the initial received information signal, and wherein said second plurality of layers corresponds to as many layers as said second transmission rank; and
   said processor is further adapted to decode said at least part of said retransmitted information signal using knowledge of said second mapping.

30. The receiver of claim 29, wherein said second transmission rank is equal to two.

31. The receiver of claim 30, wherein said first transmission rank is four.

32. The receiver of claim 30, wherein said first transmission rank is three.

33. The receiver according to claim 29, wherein there are two HARQ processes available for said simultaneous transmission.

34. The receiver according to claim 29, wherein said second transmission rank during said retransmission is determined based on a channel rank of said radio channel.

35. The receiver according to claim 29, wherein each of said codewords comprise a plurality of channel encoded bits originating from a block of information bits.

36. The receiver according to claim 29, wherein said first plurality of layers are symbol streams which are input in parallel to a precoder to generate said information signal.

* * * * *

UNITED STATES PATENT AND TRADEMARK OFFICE
CERTIFICATE OF CORRECTION

PATENT NO.        : 8,064,394 B2                                    Page 1 of 1
APPLICATION NO.   : 12/029103
DATED             : November 22, 2011
INVENTOR(S)       : Jongren et al.

It is certified that error appears in the above-identified patent and that said Letters Patent is hereby corrected as shown below:

On the Title Page, item (56), under "OTHER PUBLICATIONS", in Column 2, Lines 8-10, delete "Samsung, "Considerations on Codewords .......... Jan. 2007, pp. 1-8.".

In Column 3, Line 17, delete "preceding," and insert -- precoding, --, therefor.

In Column 7, Line 56, delete "retransmissions" and insert -- retransmissions, --, therefor.

In Column 11, Line 10, delete "11104." and insert -- 1104. --, therefor.

Signed and Sealed this
Second Day of October, 2012

David J. Kappos
*Director of the United States Patent and Trademark Office*